United States Patent Office 3,671,183
Patented June 20, 1972

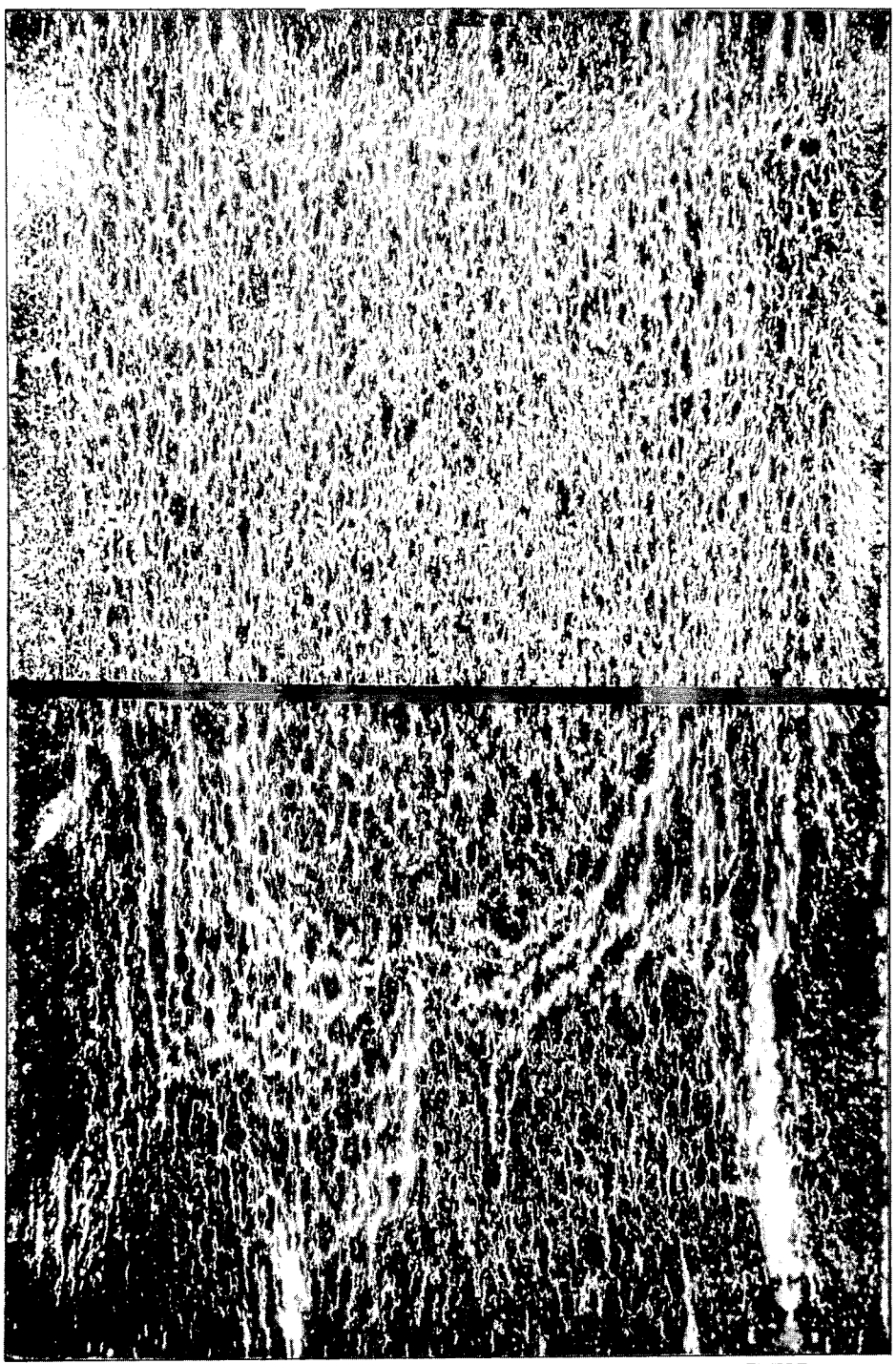

3,671,183
MANUFACTURING A SENSITIVE NON-FLAMMABLE DYE PENETRANT
Orlando G. Molina, Westminster, Calif., assignor to North American Rockwell Corporation
Filed Mar. 5, 1970, Ser. No. 16,806
Int. Cl. D06p 1/68
U.S. Cl. 8—85                                   7 Claims

ABSTRACT OF THE DISCLOSURE

A first homogeneous aqueous liquid fluorescent dye penetrant, containing a major proportion of water, is processed into a second homogeneous liquid dye penetrant, formed by extracting the first liquid with a volatile, stable halocarbon, liquid at room temperature. The second liquid, a halocarbon extract, noticeable less fluorescent than the first aqueous liquid penetrant, is a more sensitive liquid dye penetrant microcrack detector. The halocarbon dye penetrant is also nonflammable.

CROSS REFERENCE

This application is related to the copending application Ser. No. 655,752, filed July 25, 1967 by O. G. Molina, now abandoned in favor of a continuation application Ser. No. 68,475, filed on Aug. 31, 1970.

BACKGROUND OF THE INVENTION

Dye penetrants are widely used to nondestructively test metal workpiece surface for gross voids and microcracks. Typically, liquid dye penetrant is applied to a metal surface of a workpiece, the excess penetrant is removed from the surface by solvent or water wash, without removing the entrapped penetrant from surface defects. The part is dried and inspected for defects. The surface is observed microscopically if necessary, to detect the size and degree of microcrack defects. Fluorescent dyestuff penetrant compositions deposit fluorescent dyes in the microdefect structure. The fluorescent dyes are particularly sensitive in revealing microcrack defects when viewed under light which intensifies visible fluorescence. Toxic and flammable solvents are generally undesirable compontnts of dye penetrant compositions, in view of the general shop practices where workpieces are inspected. The sensitivity of the dye penetrant to liquid oxygen can be an important factor in inspection of rocket metal components, where liquid oxygen is a propellant component.

The halocarbon solvent base dye penetrant eliminates the fire hazard problem, greatly reduces the toxicity problem, and can contribute a greatly reduced LOX impact sensitivity explosion hazard.

SUMMARY OF THE INVENTION

A first homogeneous aqueous liquid, fluorescent dye penetrant contains N-methyl-2-pyrrolidone, a fluorescent dyestuff, a wetting and spreading agent, a fluorescent dye brightener in a solvent base of water. The first dye penetrant is useful as a low cost dye penetrant of reasonably adequate sensitivity. The above penetrant is processed into a second homogeneous liquid dye penetrant by extracting the first penetrant liquid with a volatile halocarbon, which is a volatile liquid at room temperature. The second liquid dye penetrant is the liquid halocarbon extract, noticeably less fluorescent than the first liquid penetrant, but it is a more sensitive microcrack detector, in the presence of light of a wavelength intensifying the dye fluorescence. The volatile halocarbon is non-flammable and low in toxicity.

Included in the objects of this invention are:

First, to provide a highly sensitive homogeneous nonflammable liquid fluorescent dye penetrant for metal workpieces.

Second, to provide a process for manufacturing a highly sensitive, nonflammable homogeneous liquid fluorescent dye penetrant.

Third, to provide a process for processing a low cost homogeneous liquid fluorescent dye penetrant containing a major concentration of water into a more sensitive, halocarbon base liquid fluorescent dye penetrant.

Further objects and advantages of this invention will become apparent in the following description, to be read in conjunction with the accompanying photograph.

BRIEF DESCRIPTION OF THE DRAWING

FIG. 1 is a microphotograph of a quenched aluminum test specimen, comparing the sensitivity of the improved dye penetrant of this invention with the sensitivity of the predecessor dye penetrant.

DESCRIPTION OF THE PREFERRED EMBODIMENT

A low cost dye penetrant homogeneous aqueous liquid of moderate sensitivity for microdefect detection in metal surfaces has the typical composition of Example I.

EXAMPLE I

|                                          | Parts by Volume |
|------------------------------------------|----------------|
| N-methyl-2-pyrrolidone                   | 2.5            |
| Nonionic wetting and spreading agent [1] | 15.0           |
| Brightening agent for fluorescent dye [2]| 1.0            |
| Fluorescent dye [3]                      | 0.5            |
| Distilled water                          | 25.0           |

[1] Typically Tergitol TMN—trimethyl nonanol polyethyleneglycol (CH₃)₃C₉H₁₆O(CH₂CH₂O)₆H.
[2] Calcofluor White RW—a fluorescent dye brightener manufactured under U.S. 2,920,203, issued Jan. 5, 1960.
[3] Fluorol 7 GA—Color Index No. equivalent to Fluorescent Brightener Agent No. 75 of the Colour Index, 2nd edition, 1956, published by A.A.T.C.C. and Society of Dyers and Colourists, New York, N.Y., and London England.

The composition of Example I is a low cost, odor free dry penetrant which is sufficiently fluorescent to be useful in inspection of metal castings and rough surfaces. Other equivalent wetting and spreading agents, brightening agents and fluorescent dyestuffs can be formulated into equivalents of Example I, utilizing the equivalents listed in the copending U.S. patent application Ser. No. 68,475, filed Aug. 31, 1970 by this applicant. Other ratios of components can be formulated into a homogeneous liquid, substantially water based solvent, dye penetrant composition, as taught above. Within the component concentration term usage of this application, the N-methyl-2-pyrrolidone, fluorescent dye, and brightening agent volume concentrations of Example I are minor volume concentrations. Typically the minor volume concentrations can range up to 5 parts by volume. In Example I, the major volume concentrations of nonionic wetting and spreading agents can typically range from 10 to 20 parts by volume.

The Example I composition is not as sensitive in displaying microdefects as are the dye penetrants disclosed and taught in the above referenced patent application.

EXAMPLE II

The new, more sensitive dye penetrant of Example II is typically manufactured by extracting one part by volume of the Example I composition with 20 parts by volume of a liquid halocarbon, which is volatile at room temperature. Specifically, $CCl_2F\text{-}CClF_2$ (1-dichloro-1-fluoro 2-chloro-2-difluoro ethane), B.P. 118° F., is a useful liquid halocarbon extractant. Other halocarbon liquids, volatile at room temperature are equivalent, as will be enumerated later.

After thoroughly agitating the two immisicible liquids, they are allowed to separate on standing. The separated aqueous layer is a gel, containing a substantial concentration of the fluorescent dye, and the nonionic wetting and spreading agent. The separated fluorocarbon extractant layer does not strongly fluoresce, and it is the Example II dye penetrant.

The Example II dye penetrant is a very sensitive fluorescent dye penetrant, more sensitive in an ultraviolet light microcrack inspection procedure than the water based Example I dye penetrant. Comparative microcrack standard inspection tests were made on a standard thermally treated microcrack sensitivity specimen block. The block was 2014 aluminum alloy, quenched in water. The cracks were uniform over the block surface, varying in length. A groove was disposed across the specimen block, separating the two equal block areas for comparison tests. The microphotograph of FIG. 1 clearly illustrates the contrast in microcrack detection sensitivity of Example I and Example II dye penetrants. The uniform microcrack structure is quite markedly better outlined by the Example II dye penetrant, as compared to the Example I dye penetrant.

The teaching of higher microcrack sensitivity of Example II, the halocarbon dye penetrant manufactured from Example I, is an advance in the art. The aqueous base Example I dye penetrant wets metal very well and carries the fluorescent dye into the microcrack structure, as the polar water solvent is the familiar very good wetting agent. As a comparison, the extraction process with a (20/1) volume ratio of (halocarbon/Example I), can only result in a substantially more dilute fluorescent dye solution in halocarbon (Example II), due to the volume dilution effect. In addition, some of the wetting and spreading agent is likewise left in the aqueous layer. The extracted Example II product is a much more sensitive dye penetrant, as illustrated by the comparison data of FIG. 1.

Typically, the specimen block example shown in FIG. 1 was prepared by brushing the respective Example I and Example II dye penetrant solutions on to each half of the block. The excess of each solution was washed off with water spraying, and the excess water removed by an air blast.

The extraction process taught in this invention is illustrated in Example II with a fluorocarbon. Other halocarbons can be used as extractant fluids and are fully equivalent to the 1-dichloro 1-fluoro-2-chloro-2-difluoro-ethane solvent of Example II. Typical equivalent halocarbons are easily volatile at room temperature, relatively nontoxic, do not hydrolyse on contact with water, and are relatively inexpensive. Some typical equivalent halocarbons are listed in Table I.

TABLE I

| No. | Name | Formula | B.P., °F. |
|---|---|---|---|
| 1 | 1-bromo-1-difluoro-2-bromo-2-difluoro ethane | $CBrF_2$—$CBrF_2$ | 118 |
| 2 | 1-dichloro-1-fluoro-2-chloro-2-difluoro ethane | $CCl_2F$—$CClF_2$ | 118 |
| 3 | 1-dichloro-1-fluoro-2-dichloro-2-fluoro ethane | $CCl_2F$—$CCl_2F$ | 199 |
| 4 | 1,1,1 trichloro ethane | $CCl_3CH_3$ | 165 |
| 5 | Trichloroethylene | $CHCl=CCl_2$ | 188 |
| 6 | Tetrachloro ethylene | $CCl_2=CCl_2$ | 250 |

The halocarbon solvent base of the new and improved dye penetrant obviously lowers the susceptibility of the dye penetrant to LOX impact sensitivity. Since the volatile halocarbons are not combustible, any solvent traces remaining after microcrack inspection should not support an explosive combustion with liquid oxygen.

The chemical mechanism resulting in increased sensitivity of the extracted halocarbon solvent dye penetrant, as compared to its predecessor aqueous dye penetrant, is not well understood, particularly since the volume dilution effect should reduce the concentration of the other active components in the halocarbon based dye penetrant.

Obviously many modifications can be made in this improvement in a process for manufacturing a sensitive dye penetrant and an improved sensitive dye penetrant composition. It is therefore understood that within the scope of the appended claims, the invention may be practiced otherwise than as specifically described.

I claim:
1. The process of manufacturing a sensitive dye penetrant for microcrack detection comprising:
   (a) forming a volume of aqueous homogenous liquid dye penetrant containing up to five parts by volume of N-methyl-2-pyrrolidone, up to five parts by volume of a fluorescent dye soluble in said pyrrolidone, up to five parts by volume of a brightening agent for said fluorescent dye and soluble in said pyrrolidone, and between 10 to 20 parts by volume of a water soluble nonionic wetting and spreading agent compatable with said pyrrolidone and water;
   (b) extracting said aqueous homogeneous liquid dye penetrant with at least an equal volume of a nontoxic, nonhydrolysable halocarbon having a boiling temperature of less than 260° F. at standard atmospheric pressure; and
   (c) separating said extracting homogeneous halocarbon, to form a sensitive, halocarbon dye penetrant solution.

2. The modification of the process of claim 1, wherein said volume of extracting halocarbon is more than an equal volume of said aqueous dye penetrant.

3. The modification of the process of claim 1, wherein said extracting halocarbon volume is a large multiple volume of said aqueous dye penetrant.

4. The modification of said process of claim 1, wherein the halocarbon is 1-dichloro-1-fluoro-2-difluoro-2-chloro ethane.

5. The modification of the process of claim 4, wherein said extracting halocarbon is a large multiple volume of said aqueous dye penetrant.

6. The homogeneous halocarbon liquid dye penetrant obtained by:
   (a) forming a volume of aqueous homogeneous liquid dye penetrant containing up to five parts by volume of N-methyl-2-pyrrolidone, up to five parts by volume of a fluorescent dye soluble in said pyrrolidone, up to five parts by volume of a brightening agent for said dye and soluble in said pyrrolidone, and between 10–20 parts by volume of a nonionic water soluble wetting and spreading agent nonyl phenyl polyethylene glycol;
   (b) extracting said aqueous homogeneous liquid dye penetrant with a volume of 1-dichloro-1-fluoro-2-chloro-2 difluoro ethane halocarbon at least equal to the volume of said aqueous liquid; and
   (c) separating said homogeneous halocarbon liquid dye penetrant solution.

7. The modification of the process of claim 1 wherein said wetting and spreading agent is trimethyl nonanol polyethylene glycol.

References Cited

UNITED STATES PATENTS

| 3,561,262 | 2/1971 | Borucki | 73—104 |
| 3,555,071 | 1/1971 | Rao | 260—453 |
| 3,096,142 | 7/1963 | Hartmark | 8—85 |

GEORGE F. LESMES, Primary Examiner

T. J. HERBERT, Jr., Assistant Examiner

U.S. Cl. X.R.

8—94; 117—37 R; 252—301.3 R